Sept. 11, 1962 D. C. HORNEY 3,053,552
ADJUSTABLE LINK
Filed Nov. 30, 1959 2 Sheets-Sheet 1
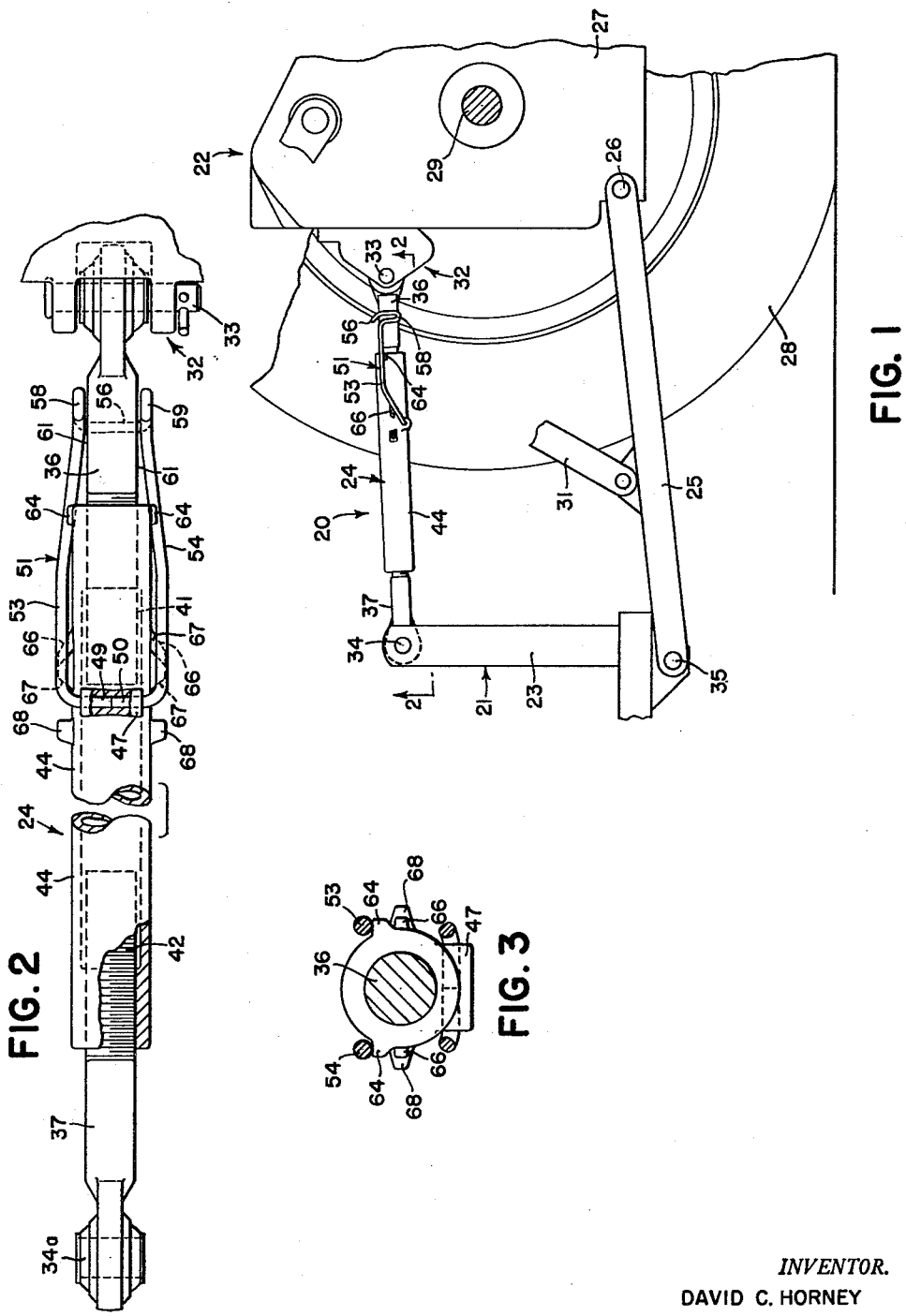
INVENTOR.
DAVID C. HORNEY
ATTORNEYS

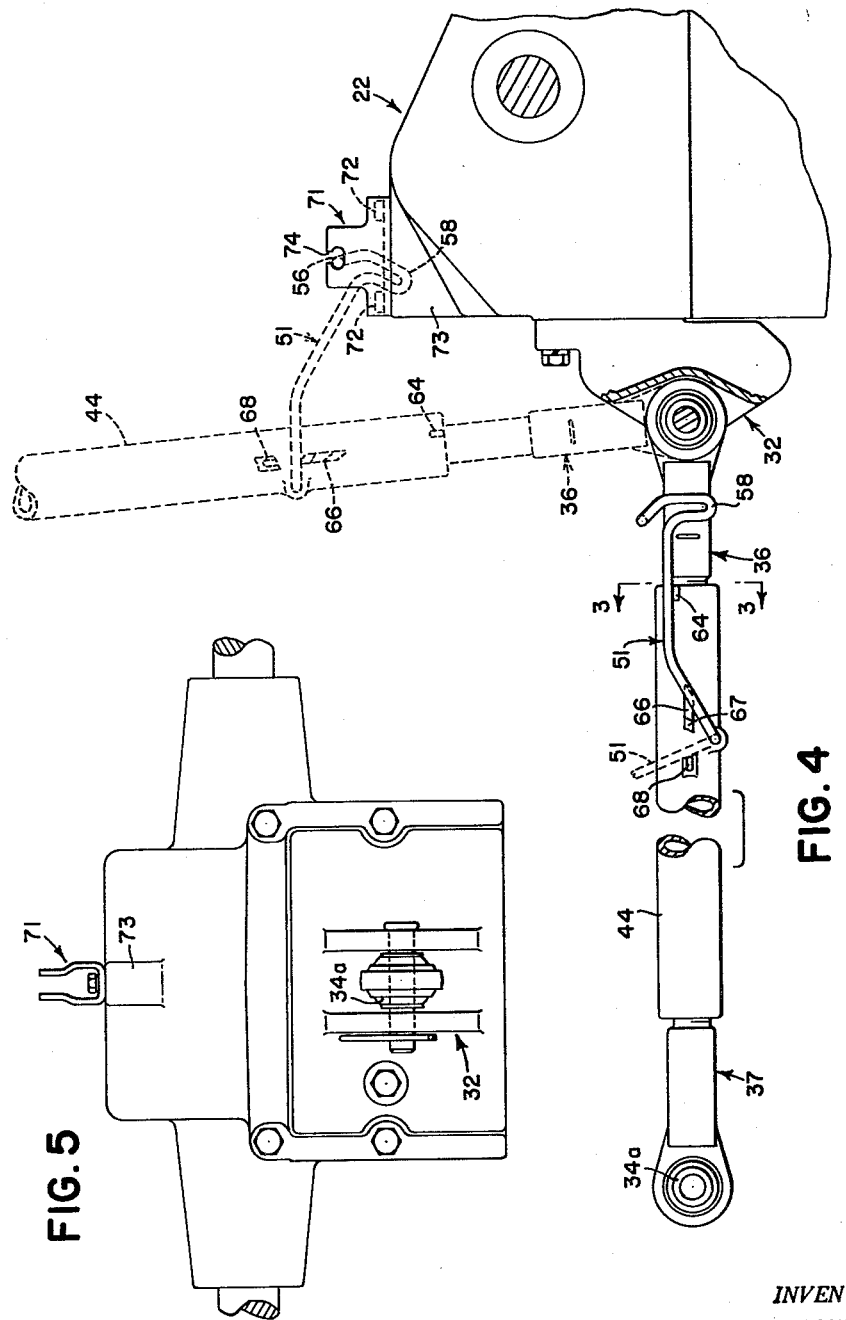

United States Patent Office 3,053,552
Patented Sept. 11, 1962

3,053,552
ADJUSTABLE LINK
David C. Horney, Waterloo, Iowa, assignor to Deere & Company, Moline, Ill., a corporation of Delaware
Filed Nov. 30, 1959, Ser. No. 856,176
4 Claims. (Cl. 280—461)

The present invention relates generally to agricultural implements and more particularly to hitch devices for connecting agricultural implements and the like to farm tractors or other propelling means.

The object and general nature of this invention is the provision of a new and useful locking type quick adjustable link especially adapted for use with agricultural implement hitch devices for connecting the implement to a tractor or the like.

A further feature of this invention is the provision of an adjustable link construction in which means is provided for operating the rotating part of the adjustable link for effecting the adjustment desired, in connection with means for locking the adjustable part in selected position and holding it against random or inadvertent movement out of the position selected.

Another feature of this invention is the provision of a hitch link of the turnbuckle type, having a locking handle formed of spring wire swingably connected with the rotatable member and having resilient side portions cooperating with associated means on the rotatable member for releasably holding the swingable member in a position locking the rotatable member against movement out of the selected position. Further, it is a feature of this invention to provide abutment means on the rotatable member for yieldably preventing undesired movement of the locking handle out of its locking position. Another feature of this invention is the provision of abutment means on the rotatable member serving as stop means for determining the outwardly extending position of the locking handle, whereby the latter may conveniently be employed for rotating the rotatable member to effect an adjustment in the effective length of the link.

Still further another feature of this invention is the provision of means on the tractor to receive the locking handle of the adjustable link for the purpose of holding the latter, when disconnected from the associated implement, in a generally vertical position so as to dispose the link out of the way of any other implement or parts with which the tractor may be associated when the adjustable link is not in use.

These and other objects and advantages of the present invention will be apparent to those skilled in the art after a consideration of the following detailed description, taken in conjunction with the accompanying drawings, in which:

FIG. 1 is a fragmentary side view showing portions of a tractor and associated implement with means incorporating the present invention interconnected between the implement and the tractor.

FIG. 2 is a bottom view at an enlarged scale showing the adjustable link in the position which it occupies in FIG. 1.

FIG. 3 is a sectional view taken generally along the line 3—3 of FIG. 4.

FIG. 4 is an enlarged view, somewhat similar to FIG. 1, showing in dotted lines the storage portion of the adjustable link when the latter is disconnected from the implement.

FIG. 5 is a fragmentary end view, taken from the rear and looking forwardly showing the means on the tractor to receive the link in its storage position.

Referring first to FIG. 1, the present invention has been illustrated as incorporated in hitch means 20 acting to connect an agricultural implement 21 with a farm tractor 22. The implement 21 may be of any suitable character, and as shown in FIG. 1, the implement 21 represents a plow, the frame of which includes a generally vertical mast section 23 to which an upper link 24 and two lower links 25 of the hitch 20 are connected. The tractor 22, to which the forward ends of the upper and lower links 24 and 25 are pivotally connected, is also of generally conventional construction, embodying a main frame or housing 27 in which the transmission and other parts are disposed, drive wheels 28 and power lift mechanism that includes lift arms, one on each side of the tractor, connected through lift links 31 with the two lower links 25 of the hitch 20. Also, the tractor 22 carries suitable connector means 32 to which the front end of the upper link 24 is pivotally connected, as by a pivot pin 33. The lower links 25 are pivotally connected with the tractor by pins 26.

The present invention is particularly concerned with the upper link 24 which, according to this invention, is in the nature of an adjustable turnbuckle device, pivotally connected for generally universal movement with the upper portion of the mast 23 through a rear pin 34 and associated ball and socket type connector 34a.

The adjustable link 24 comprises front and rear end parts 36 and 37, the former being the part that is mounted on the pin 33 while the rear part 37 is the part that is mounted on the pin 34, both of these connections being of universal character, that is, they permit universal movement between the link 24 and the implement and tractor. The adjacent portions of the end parts 36 and 37 are screw threaded, as indicated at 41 and 42, and are screwed into a rotatable sleeve member 44, the end portions of which are threaded and receive the threaded end portions 41 and 42. The threads on the end members 36 and 37 and the ends of the sleeve member 44 are of opposite hand, whereby rotation of the member 44 in one direction or the other serves to extend or retract the end members 36 and 37 in a generally axial direction, thus increasing or decreasing the effective length of the link 24.

According to this invention, new and improved means are provided for easily and conveniently rotating the sleeve member 44 when length adjustment is desired, for holding the rotatable member 44 against rotation when changes in the length of the link 24 are not desired, and for holding the link 24 in a transport or storage position on the tractor when the implement is disconnected from the tractor.

Referring now to FIGS. 2, 3 and 4, the rotatable sleeve member 44 is provided with a lower transversely apertured boss 47 in which laterally inturned ends 49 and 50 of a locking handle member 51 are disposed. The handle member 51 is formed of spring wire and includes side sections 53 and 54 that are resilient. The locking handle member 51, opposite the inturned ends 49 and 50, is provided with a bight portion 56, and adjacent the bight portion 56 the handle member 51 is formed with two loops portions 58 and 59. The end member 36 is generally rectangular in cross section and is provided with flat sides 61. The loop portions 58 and 59 of the locking handle member 51 are spaced apart so that when the locking handle 51 is swung into the locking position, shown in FIGS. 1 and 2 and in full lines in FIG. 4, the loop portions 58 and 59 are disposed substantially against the flat sides 61 of the end member 36 and in this way they prevent any inadvertent rotation of the rotatable member 44. Stops 64 (FIGS. 3 and 4) are provided on the rotatable sleeve member 44 to limit the downward swinging of the locking handle member 51.

The rotatable sleeve member 44 is also provided with a pair of projections or abutments 66 over which the resilient side portions 53 and 54 are adapted to be passed when the handle member 51 is swung from its dotted line position, FIG. 4, to its locking position, shown in full lines in FIG. 4. Thus, the locking handle 51 is normally retained in its locking position. The projections 66 have inclined ends 67 to facilitate movement of the side sections 53 and 54 across the projections.

The handle member 51 is adapted to be swung upwardly from its working position (full lines, FIG. 4), forced past the projections 66, and then brought up against a pair of stops 68 on opposite sides of the sleeve member 44, as shown in dotted lines in the left portion of FIG. 4, and in this position of the handle member 51, the latter is adapted to be used as a handle or lever for rotating the member 44 to effect an adjustment of the locking link 24.

The rear ends of the upper and lower links 24 and 25 have a quick detachable connection through the pins 34 and 35, FIG. 1, and by taking out the pins 34 and 35 on the implement 21, may be disconnected readily from the tractor. When the implement is disconnected from the tractor, the lower links 25 are supported by the tractor hydraulic system or power lift through the lift links 31. According to this invention, I make use of the locking handle 51 as means for holding the link 24 in a storage or non-working position, which position is shown in dotted lines in FIG. 4. For this purpose I mount a hook 71 on the upper generally central portion of the tractor 22, fastening the hook 71 in position by bolts 72 or the like to a boss 73 on the tractor body. The upper portion of the hook 71, which is in the nature of a U-shaped member, best shown in FIG. 5, is provided with sides having slots 74 in which the bight portion 56 of the locking handle 51 may be placed, as will be seen from FIG. 4, and when so placed the loop portions 58 and 59 are disposed against opposite sides of the hook 71 and the associated tractor boss 73, whereby the link, held in a vertical position for transport, is also held against undesirable lateral displacement.

Having described my invention, what I desire to secure by Letters Patent is:

1. An adjustable link incorporated in the connection between an implement and a tractor, said adjustable link comprising a rotatable member, a pair of end members threadedly interconnected by said rotatable member, one of said end members being removably connected with the implement and the other end member being swingably connected with the tractor, a handle member swingably connected with said rotatable member for movement relative thereto about an axis transverse with respect to the axis of rotation of said rotatable member, whereby when said handle member extends outwardly from the rotatable member the handle member is adapted to serve as means for rotating said rotatable member, said handle member including a looped portion engageable with one of said end members to lock said rotatable member against rotation, the portions of said end member engaged by the looped portion being non-circular and means on the tractor to receive said handle member when said one end member is disconnected from the implement and acting through said handle member to hold said adjustable link in a storage position, said tractor-carried means being located on the tractor above the point of connection of said other end member therewith whereby in its storage position the adjustable link is disposed generally vertical.

2. An adjustable link comprising a pair of relatively shiftable end parts, a rotatable member having threaded connections with said parts, a locking member pivoted on said rotatable member for swinging movement between a first position, locking said rotatable member to one of said end parts to prevent random changes in the position of said rotatable member, and a second position extending laterally outwardly from said rotatable member to serve as means for rotating said rotatable member, said one end part having generally flat opposite portions adjacent one end of said rotatable member and said locking member comprising a spring wire part having resilient side portions, inturned ends swingably carried by said rotatable member and a looped bight portion having spaced apart sections adapted to engage said opposite flattened sides of said one end part.

3. An adjustable link adapted to be mounted between a tractor and a trailing implement, said link comprising a front part which is adapted to be pivotally secured to the tractor, said front part having a forward portion which is rectangular in cross-section and a threaded rear portion, a rear part which is adapted to be pivotally secured to the trailing implement, said rear part having a forward threaded portion, the threads on the front and rear parts being of opposite hand, a sleeve member which is internally threaded, the threads on the forward portion of the sleeve member cooperating with the threads on the front part, and the threads on the aft portion of the sleeve member cooperating with the threads on the rear part, whereby rotation of the sleeve member in one direction will cause the front part and the rear part to be moved towards each other and rotation in the opposite direction will cause the front part and the rear part to be moved away from each other, a transversely apertured boss on said sleeve, a locking member pivoted on said sleeve for swinging movement between a first position, locking said sleeve to one of said end parts to prevent random changes in the position of said sleeve, and a second position extending laterally outwardly from said sleeve to serve as means for rotating said sleeve, said locking member being formed of spring wire, said locking member having two parallel side sections that are resilient, normally downwardly projecting loop portions on the forward end of each side section, a bight portion interconnecting the two loop portions, the distance between the legs of the bight portion being substantially equal to the distance between the two parallel faces of the rectangular portions of said front part, inturned ends being disposed within said apertured boss, abutments disposed on opposite sides of the sleeve member and forward of the apertured boss, said abutments having tapered side surfaces, stops mounted on opposite sides of the sleeve member to the rear of the apertured boss, and stops mounted on opposite sides of the sleeve member forward the abutments.

4. An adjustable link comprising a pair of relatively shiftable end parts, a rotatable member having threaded connections with said parts, a locking member pivoted on said rotatable member for swinging movement between a first position, locking said rotatable member to one of said end parts to prevent random changes in the position of said rotatable member, and a second position extending laterally outwardly from said rotatable member to serve as means for rotating said rotatable member, said one end part having generally flat opposite portions adjacent one end of said rotatable member and said locking member comprising a wire part having side portions, inturned ends swingably carried by said rotatable member and a looped bight portion having spaced apart sections adapted to engage said opposite flattened sides of said one end part.

References Cited in the file of this patent

UNITED STATES PATENTS

| 506,302 | Bowers | Oct. 10, 1893 |
| 1,108,230 | Possner et al. | Aug. 25, 1914 |
| 1,765,072 | Hashimoto | June 17, 1930 |
| 2,364,992 | Maurette | Dec. 12, 1944 |
| 2,786,364 | Sawyer | Mar. 26, 1957 |
| 2,844,397 | Du Shane | July 22, 1958 |
| 2,929,458 | Cole | Mar. 22, 1960 |
| 2,998,989 | Silver et al. | Sept. 5, 1961 |

FOREIGN PATENTS

| 581,698 | Canada | Aug. 18, 1959 |